L. S. BRACH.
NUT LOCK.
APPLICATION FILED JULY 27, 1909.
1,077,254.
Patented Nov. 4, 1913.
Fig. 1.
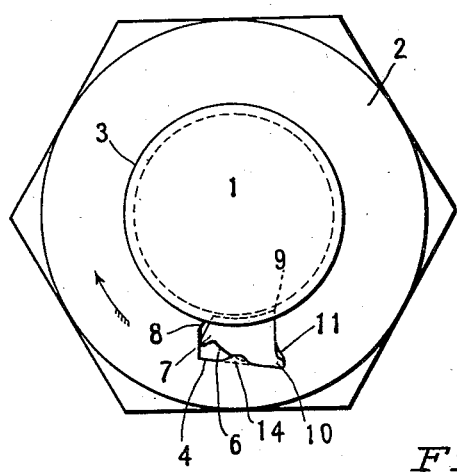
Fig. 2.
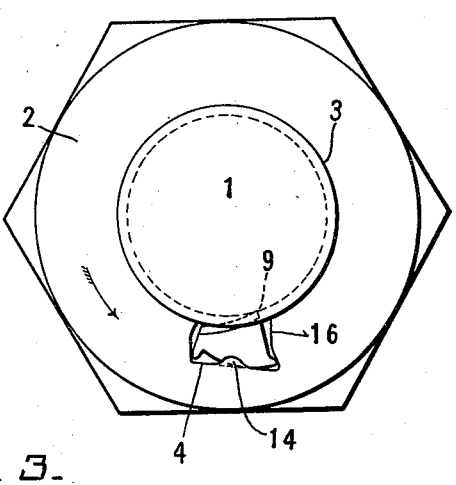
Fig. 3.
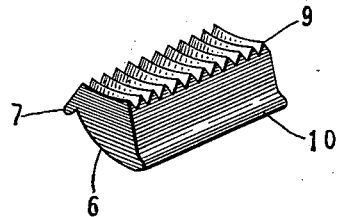
Fig. 4.
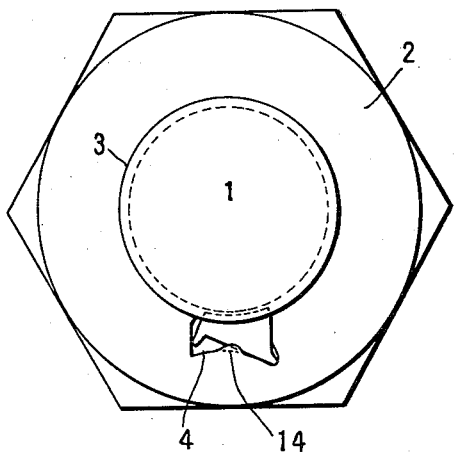
Fig. 5.
WITNESSES:
J. Clyde Tipley.
M. Buscher
INVENTOR
Leon S. Brach
BY
Wilson, Kent & Ramsey,
ATTORNEYS
COLUMBIA PLANOGRAPH CO., WASHINGTON, D. C.

UNITED STATES PATENT OFFICE.

LEON S. BRACH, OF NEW YORK, N. Y.

NUT-LOCK.

1,077,254.  Specification of Letters Patent.  Patented Nov. 4, 1913.

Application filed July 27, 1909. Serial No. 509,805.

*To all whom it may concern:*

Be it known that I, LEON ST. CLAIR BRACH, residing at New York city, in the county of New York and State of New York, have invented certain new and useful Improvements in Nut-Locks, of which the following is a specification.

This invention relates to the type of nut locks in which a movable locking member, preferably carried by the nut, and unaided by an auxiliary device is made to prevent or lock the nut from unscrewing on its bolt, stud or rod, by friction against or biting into the bolt, stud or rod, whenever there is any tendency to unscrew or turn back the nut, while it allows the nut to be turned in the other direction freely, for the purpose of screwing it up.

The object of this invention is to provide in a device of the kind described, a locking member interposed between the bolt and the nut and carried by one of them, said locking member having a portion adapted for rolling engagement with one of said members, and for frictional engagement with the other.

Another object is to provide a locking member as aforesaid, which is oscillatory with respect to the nut and bolt, and whose center of oscillation tends to approach that of the nut when the latter is rotated in one direction, and to recede therefrom when it is rotated in the other direction.

A further object is to provide a locking member interposed between the nut and the bolt and having a portion adapted for rolling engagement with one of said members and for gripping engagement with the other of said members, the portion that is adapted for the gripping engagement being shaped and threaded correspondingly with the member which it engages.

A further object is to provide a locking member, as aforesaid, and to dispose said locking member in a suitably prepared recess in the nut, said recess having a bottom wall over which said locking member is adapted to have a bodily rolling movement, and having its opposite side walls so shaped as substantially to maintain a constant though loose engagement with adjacent portions of the locking member for the purpose of positively preventing any appreciable movement of the locking member toward or away from either of said side walls without interfering with the bodily rolling movement of said locking member in said recess.

Other objects of the invention will be in part obvious and in part specifically adverted to in the course of the following specification, in which are fully set forth the elements, combinations and relations of parts distinguishing the present invention, together with the advantages enumerated; and the scope of the application of the invention will be succinctly defined in the appended claims.

In the accompanying drawings which are to be taken as a part of this specification, in which I have shown a merely preferred form of embodiment of the invention: Figure 1 is a face view of a nut provided with a locking member exemplifying my present invention, illustrating the latter in position to permit of screwing the nut up on the bolt; Fig. 2 is a view similar to Fig. 1, but showing the locking member in the position which it assumes when an attepmt is made to rotate the nut in the opposite direction without restraining the function of the locking member; Fig. 3 is a detailed perspective of the locking member; and Figs. 4 and 5 are modifications, illustrating various constructions whereby a rolling engagement is insured between the locking member and the member on which it rolls.

Referring to the numerals on the drawings, 1 indicates a screw bolt or its equivalent, and 2 a nut, having the usual threaded aperture 3 for the bolt.

4 indicates a gap or recess in the inner wall of the nut, preferably extending longitudinally thereof, and throughout its entire extent. The mouth of the recess 4 is on an arc corresponding with that of the nut threads; and for reasons hereinafter explained, it is preferred that the bottom wall of the recess shall be straight, but at an angle to the line of the edges of the recess, as in the embodiment of Figs. 1 and 2.

Considering now the locking member proper, shown in Fig. 3, the same is preferably of harder material than that of the member (in this case the bolt) with which it has gripping engagement, and is provided with a face 6, whereby it may have rolling engagement with the bottom wall of the recess 4. Where the bottom wall is straight, as shown in Figs. 1 and 2, the contacting face of the locking member will need to be curved, as shown in Figs. 1, 2 and 3. But it is obvious that the bottom wall of the recess may be curved and the contacting face of the locking member straight; or the said contacting surfaces may be reversely curved or even similarly curved, provided the curves are of different radii, the only essential being such a relative shaping and arrangement of the contacting parts as that the locking member may have a rolling engagement with a wall, preferably the bottom wall of the recess. The locking member is provided with another face, adapted to engage with the threaded bolt, and the said face is accordingly curved on an arc which makes it in effect a segment of the nut, corresponding with the rest of the threading of the nut, when the parts are in the position shown in Fig. 1 and so that the edge 9 of the locking member will bite into the bolt when the locking member is rolled to the position of Fig. 2, it being understood that the locking member is of proper size and arranged so that it will assume the position of Fig. 1 when the nut is screwed down on the bolt, and the position of Fig. 2 when the nut is unscrewed. It will be noted that the edge 9 of the locking member will be held in engagement with the bolt when the parts are in the position shown in the drawings and in various other angular positions which the nut will occupy. This object is accomplished by so forming the locking member that the bulk of its material is disposed to one side of a plane cutting the edge 9 and the line of engagement of said member with the bottom wall of the recess. The locking member is preferably held against any appreciable sliding movement toward either side wall 8 or 11 of the recess at any time by so shaping both of said side walls that they will substantially maintain a constant, though loose, engagement with the opposite side portions of the locking member at all points during the bodily rolling movement of said locking member, but yet not interfering with such bodily rolling movement. To this end portions of each of said side walls are struck on curves corresponding substantially to the curves defined by adjacent projecting portions 7 and 10 of the locking member during the bodily rolling movement of said locking member, as will be apparent. The interengagement of these parts also serves to prevent dislodgment of the locking member laterally from the recess when the nut is detached from the bolt. To guard against longitudinal displacement of the locking member the top and bottom edges of the recess may be indented as by means of a punch, to form holding projection 14.

From the foregoing description and having reference to the drawing, it will be evident that in the embodiment of Figs. 1 and 2, the locking member has a rolling engagement with the bottom wall of the recess 4, and that its center of oscillation approaches the axis of the nut as the latter is rotated in one direction and recedes therefrom as it is rotated in the other direction without resorting to any lost motion or sliding movement of the locking member in the recess. The same effect is produced by the construction of Figs. 4 and 5. The effect of thus changing the center of oscillation is obviously to effect a locking or gripping engagement of the threaded face of the locking member with the bolt, when the nut is rotated to remove it from the bolt, as shown in Fig. 2.

The essential feature of this invention, it will be understood, is that the locking member shall be oscillatory with respect to the member which carries it, and that its center of oscillation shall change when such member is rotated in one direction or the other, whether this effect is produced by the shape of the locking member, the arrangement of the surface on which it rolls, or the relativity of the parts. The advantages of a construction in which the locking member rolls, over a construction in which it merely has pivotal or sliding movement are obvious. In the first place, the locking movement and the unlocking movement of the device are much quicker, and in the second place there is very much less likelihood of friction, because the opposing bearing surfaces are engaged only along a single line, as distinguished from a surface-to-surface engagement. Furthermore there is no necessity for such accuracy of adjustment between the recess and the locking member. The latter may have considerable play in the former without affecting its operativeness. By curving and threading the gripping face of the locking member to correspond with the member which it engages, any wear on the threads of the locking member at their outer edge, where they bite into the bolt, will not interfere with the action of the device, because the result will be that the gripping will be done by a portion of the threads farther inwardly of the arc of said gripping face.

Having thus described my invention, it is believed that the operation thereof will be apparent and the same will not be explained further than to say that when the nut is screwed upon the bolt, as in Fig. 1, if an attempt be made to rotate the nut in the reverse direction, the friction of the bolt threads upon the threaded engaging face of the locking member will cause the locking member to roll to the position shown in Fig. 2, the locking member acting cam-like upon the threads of the bolt, the block becoming in effect a friction cam pawl, which will prevent the unscrewing of the nut. Obviously the greater the force applied to un- screw the nut, the more powerful becomes the binding of the locking member upon the nut, unless the proper step is taken to prevent such binding action before the operation of unscrewing the nut is attempted. It will be apparent also that the action of the locking member upon the bolt is both inwardly upon the bolt and sidewise upon the threads thereof. If it be desired to interfere with the locking function, a bit of wire or the like is inserted beneath the projection 7 of the locking member between the locking member and the bottom wall of the recess which will throw and hold the locking member to the position of Fig. 1, in which the threaded engaging face of the block forms simply a continuation of the threaded nut. If the wire be inserted at the opposite side of the locking member between the locking member and the wall 16 of the recess, the locking member will be held in the position of Fig. 2, and movement of the nut relatively to the bolt may be prevented in either direction.

It is obvious, of course, that the locking member need only be interposed between the nut and the bolt, and may be carried by either one of said members, and its rolling action may be with respect to either one of them, and its gripping action with respect to the other. Other alternatives of arrangement and construction have been referred to, and still others are implied by the language of the claims.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

Having described my invention what I claim as new and desire to secure by Letters Patent is:—

1. A nut lock comprising a nut having a recess formed therein, and a locking member adapted to have a bodily rolling movement in said recess, the walls of said recess having parts of such shape as to retain said locking member against any sliding movement in said recess in the direction of its bodily rolling movement.

2. A nut lock comprising a nut having a recess formed therein, having a bottom wall and opposite side walls, and a locking member adapted to have a bodily rolling movement along the bottom wall of said recess, the opposite side walls of said recess being of such shape as to retain said locking member against any sliding movement along the bottom wall of said recess in the direction of its bodily rolling movement.

3. A nut lock comprising a nut having a recess formed therein, having a bottom wall and opposite side walls, and a locking member adapted to have a bodily rolling movement along the bottom wall of said recess, a portion of one of the side walls of said recess being curved on a curve defined by the movement of an adjacent portion of said locking member, so as to retain said locking member against any sliding movement along the bottom wall of said recess in the direction of its bodily rolling movement.

4. In a device of the class described, the combination with a bolt, of a nut provided with a longitudinally extending recess having opposite side walls and a bottom wall, and a threaded locking element within said recess having a bodily rolling movement along said bottom wall, said locking element when in locking position having one longitudinal edge of its threaded portion engaging the bolt, and the remainder of its threaded portion extending in divergent relation with a line tangent to the axis of the bolt at a point where it is engaged by said element, the bottom wall of said recess being inclined relatively to said line so as to dispose a portion of the bottom wall relatively nearer to the bolt than that portion of the bottom wall which is intersected by said line, so that in moving to locking position, the locking member rolls relatively uphill toward the bolt, the side walls of said recess being curved on a curve defined by the movement of adjacent portions of said locking member so as to retain said locking member against any sliding movement along the bottom wall of the recess in the direction of its bodily rolling movement.

5. A nut lock comprising a nut having a recess formed therein, and a locking member adapted to have a bodily rolling movement in said recess, the walls of said recess having parts adapted to coöperate with adjacent parts of the locking member to retain said locking member against sliding movement in the direction of its rolling movement in said recess, and said coöperating parts serving also to retain the locking member in the recess.

6. A nut lock comprising a nut having a recess formed therein, having a bottom wall and opposite side walls, and a locking member adapted to have a bodily rolling movement along the bottom wall of said recess, the opposite side walls of said recess being of such shape as to coöperate with adjacent parts of the locking member to retain said locking member against sliding movement in the direction of its rolling movement in said recess, and said coöperating parts serving also to retain the locking member in the recess.

7. A nut lock comprising a nut having a recess formed therein, having a bottom wall and opposite side walls, and a locking member adapted to have a bodily rolling movement along the bottom wall of said recess, parts of the opposite side walls of said recess being curved on curves defined by the movement of adjacent parts of said locking member, so as to present parts adapted to coöperate with said adjacent parts of the locking member to retain said locking member against sliding movement in the direction of its rolling movement in said recess, and said coöperating parts serving also to retain the locking member in the recess.

In testimony whereof I affix my signature in the presence of two witnesses.

LEON S. BRACH.

Witnesses:
M. A. BUSCHER,
A. HONIGSBERG.

Copies of this patent may be obtained for five cents each, by addressing the "Commissioner of Patents, Washington, D. C."